US012220910B2

(12) United States Patent
Murayama

(10) Patent No.: US 12,220,910 B2
(45) Date of Patent: Feb. 11, 2025

(54) PRINTING DEVICE CONFIGURED TO DETERMINE REVERSE CONVEYANCE AMOUNT OF PRINTING MEDIUM BASED ON CONTROL INFORMATION ACQUIRED FROM CASSETTE, AND CASSETTE ATTACHABLE TO THE PRINTING DEVICE

(71) Applicant: BROTHER KOGYO KABUSHIKI KAISHA, Nagoya (JP)

(72) Inventor: Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/552,985

(22) Filed: Dec. 16, 2021

(65) Prior Publication Data

US 2022/0203725 A1 Jun. 30, 2022

(30) Foreign Application Priority Data

Dec. 28, 2020 (JP) ................................ 2020-218629

(51) Int. Cl.
*B41J 15/04* (2006.01)
*B41J 3/407* (2006.01)
*B41J 11/70* (2006.01)

(52) U.S. Cl.
CPC ........... *B41J 15/044* (2013.01); *B41J 3/4075* (2013.01); *B41J 11/703* (2013.01)

(58) Field of Classification Search
None
See application file for complete search history.

(56) References Cited

U.S. PATENT DOCUMENTS

2010/0329767 A1* 12/2010 Sago ...................... B41J 15/044 400/613
2015/0015658 A1* 1/2015 Murata .................. B41J 15/044 347/218

(Continued)

FOREIGN PATENT DOCUMENTS

EP 1661724 A1 * 5/2006 ............. B41J 11/42
JP H07251539 A 10/1995

(Continued)

OTHER PUBLICATIONS

Japanese Office Action for the related Japanese Patent Application No. 2020-218629 dated Aug. 20, 2024.

*Primary Examiner* — Matthew G Marini
(74) *Attorney, Agent, or Firm* — KENEALY VAIDYA LLP

(57) ABSTRACT

A printing device includes: an attachment portion to which a cassette accommodating a printing medium is detachably attachable; a conveying portion for conveying the printing medium; a printing portion for printing the printing medium; a cutter portion for cutting the printed printing medium; and a controller. The controller is configured to perform: a conveying process to convey the printing medium from the printing portion to the cutter portion; a cutting process to cut the printed printing medium; an acquisition process to acquire the control information from the cassette; a determination process to determine a reverse conveyance amount of the printing medium based on the control information; and a reverse conveying process to convey a remaining non-printed portion of the printing medium from the cutter portion to the printing portion by the reverse conveyance amount determined in the determination process.

10 Claims, 5 Drawing Sheets

(56) References Cited

U.S. PATENT DOCUMENTS

| | | | | |
|---|---|---|---|---|
| 2015/0022612 | A1* | 1/2015 | Taylor | B41J 15/044 347/110 |
| 2016/0039226 | A1 | 2/2016 | Oida et al. | |
| 2018/0257395 | A1* | 9/2018 | Ogawa | B41J 2/365 |
| 2018/0277162 | A1* | 9/2018 | Kondo | B41J 11/666 |

FOREIGN PATENT DOCUMENTS

| | | | | |
|---|---|---|---|---|
| JP | 2011-136473 A | | 7/2011 | |
| JP | 2016-036907 A | | 3/2016 | |
| JP | 2019018429 A | | 2/2019 | |
| JP | 2019-098687 A | | 6/2019 | |
| WO | WO-2017022602 A1 | * | 2/2017 | B41J 29/38 |

* cited by examiner

PRINTING DEVICE CONFIGURED TO DETERMINE REVERSE CONVEYANCE AMOUNT OF PRINTING MEDIUM BASED ON CONTROL INFORMATION ACQUIRED FROM CASSETTE, AND CASSETTE ATTACHABLE TO THE PRINTING DEVICE

CROSS REFERENCE TO RELATED APPLICATION

This application claims priority from Japanese Patent Application No. 2020-218629 filed Dec. 28, 2020. The entire content of the priority application is incorporated herein by reference.

BACKGROUND

In a printing device configured to perform printing on an elongated or a tape-like printing medium such as a printing tape accommodated in a cassette, the printing medium is printed by a printing portion and is then conveyed to a cutter portion. The conveyed printing medium is cut by the cutter portion, and the printed part is separated from a non-printed part of the printing medium.

In such a printing device, there may be provided a reverse conveyance mechanism configured to convey the printing medium in a reverse direction from the cutter portion toward the printing portion after cutting the printing medium in order to reduce a margin of a leading end portion of the non-printed part of the printing medium to save consumption of the printing medium.

SUMMARY

However, in the conventional printing device described above, conceivably, an amount to convey the printing medium in reverse may be set too large in an attempt to reduce the margin. If this is the case, the printing medium may be conveyed far backward to a position where no more printing or conveyance can be performed with respect to the non-printed part of the printing medium.

Further, depending on properties, characteristics or usage conditions of the printing medium, it is likely that an error may occur in a reverse conveying mechanism of the printing device during the conveyance of the printing medium in the reverse direction.

In view of the foregoing, it is an object of the disclosure to provide a printing device capable of restraining occurrence of malfunctions during reverse conveyance of a printing medium.

In order to attain the above and other objects, according to one aspect, the disclosure provides a printing device including an attachment portion, a conveying portion, a printing portion, a cutter portion, and a controller. The attachment portion is configured to detachably receive a cassette accommodating a tape-like printing medium. The conveying portion is configured to convey the printing medium in a normal conveying direction and in a reverse conveying direction opposite each other. The printing portion is configured to perform printing on the printing medium. The cutter portion is configured to cut the printing medium after the printing. The controller is configured to perform a conveying process, a cutting process, an acquisition process, a determination process; a reverse conveying process. The conveying process is to control the conveying portion to convey the printing medium in the normal conveying direction from the printing portion to the cutter portion. The cutting process is to control the cutter portion to cut the printing medium to separate a portion of the printing medium printed by the printing portion from a remaining non-printed portion of the printing medium. The acquisition process is to acquire the control information from the cassette received in the attachment portion. The determination process is to determine a reverse conveyance amount of the printing medium based on the control information acquired in the acquisition process. The reverse conveying process is to control the conveying portion to convey the remaining non-printed portion of the printing medium in the reverse conveying direction from the cutter portion to the printing portion by the reverse conveyance amount determined in the determination process.

With this configuration, the reverse conveyance amount is determined based on the control information associated with the cassette, so that the reverse conveyance amount of the printing medium can be adjusted based on the characteristics of the printing device and/or the printing medium. Accordingly, occurrence of a failure in reverse conveyance of the printing medium can be restrained.

According to another aspect, the disclosure also provides a cassette for printing including tape-like printing medium, a case, and a storage portion. The case accommodates therein the printing medium. The case has an opening portion to expose the printing medium to an outside of the case for printing on the printing medium. The printing medium is configured to be conveyed in a normal conveying direction from an inside of the case to the opening portion and in a reverse conveying direction opposite to the normal conveying direction. The storage portion stores control information relating to a reverse conveyance amount of the printing medium, the reverse conveyance amount being an amount by which the printing medium is conveyed in the reverse conveying direction.

With this configuration, since the reverse conveyance amount by the printing device is determined based on the control information stored in the cassette, the reverse conveyance amount of the printing medium can be adjusted based on the characteristics of the printing device and/or the printing medium. Accordingly, occurrence of a failure in reverse conveyance of the printing medium can be restrained.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

1. First Embodiment

A printing device 100 and a cassette 10 according to one embodiment of the present disclosure will be described with reference to the accompanying drawings.

<Structure of Printing Device 100>

Firstly, a structure of the printing device 100 will be described with reference to FIGS. 1 through 3.

Figure 1:
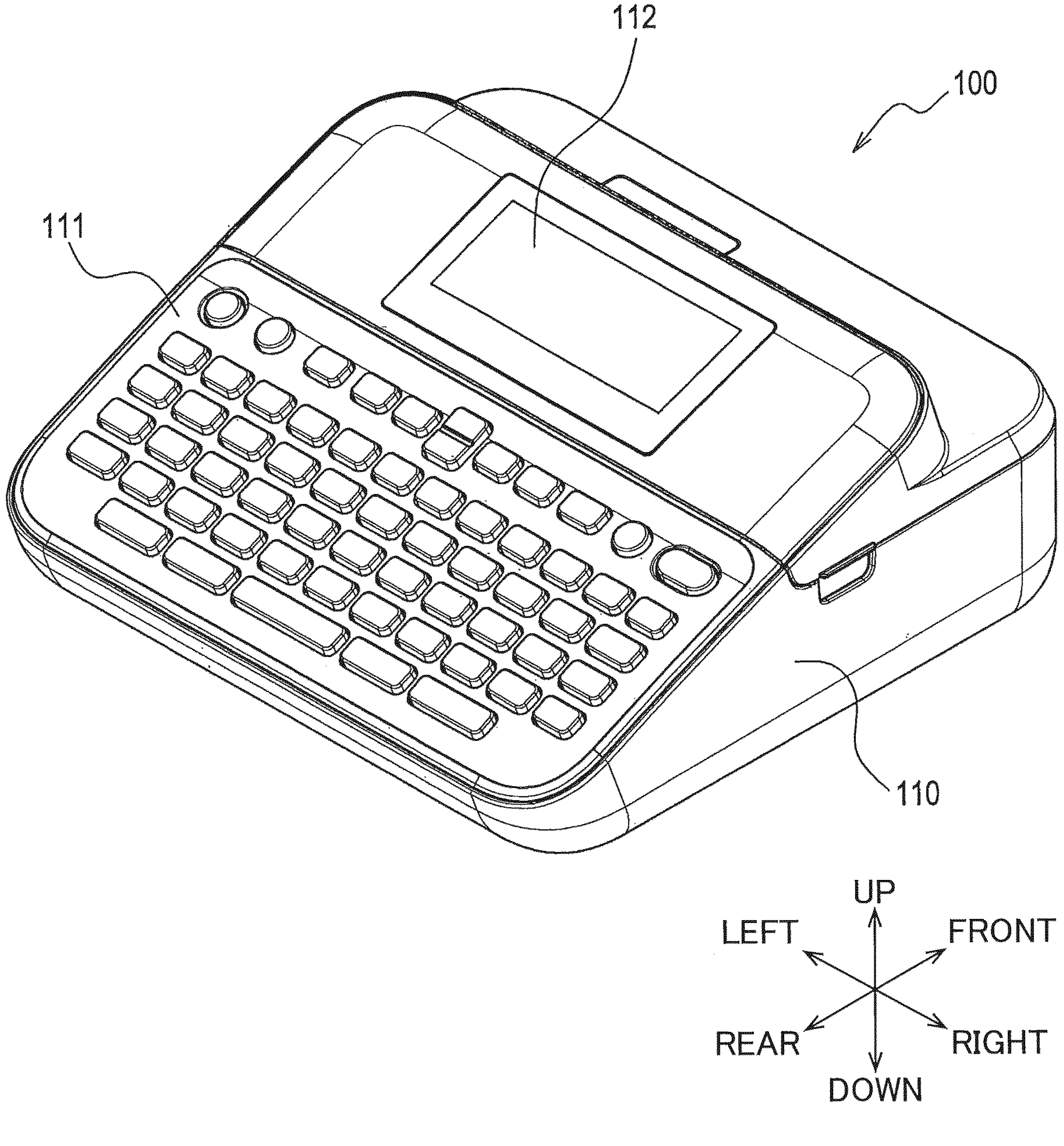
FIG. 1 is a schematic perspective view of a printing device according to one embodiment of the disclosure.
Figure 2:
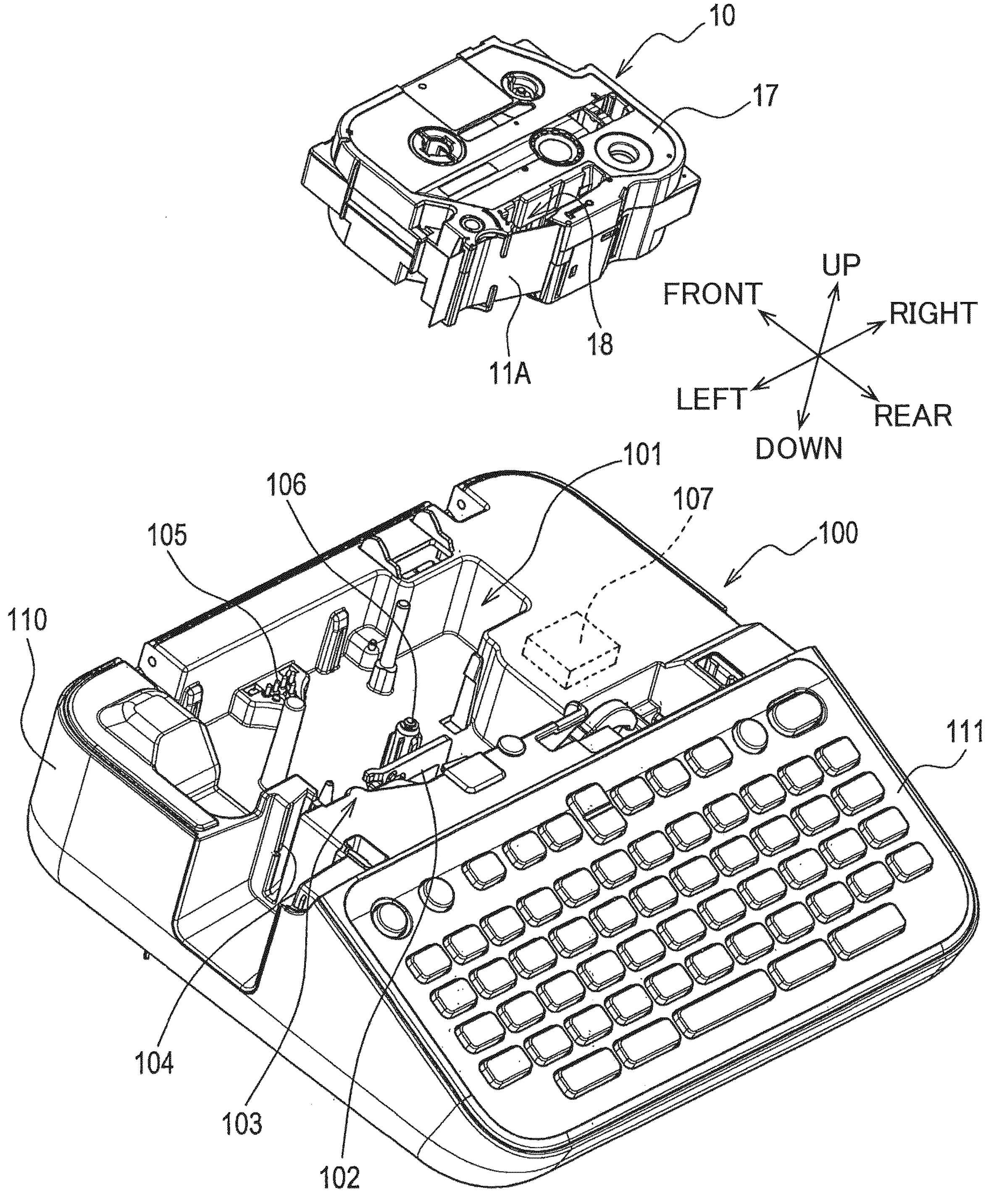
FIG. 2 is a schematic perspective view illustrating the printing device, and a cassette to be used for printing with the printing device.

The printing device 100 illustrated in FIG. 1 is configured to perform printing on an elongated or a tape-like printing medium accommodated in the cassette 10 illustrated in FIG. 2. As illustrated in FIG. 1, the printing device 100 includes a housing 110, a keyboard 111, and a display 112.

The keyboard 111 is an inputting device for accepting user's inputs on printing contents such as letters and on function settings. The display 112 is configured to display the printing contents inputted at the keyboard 111, and information such control errors, and the like.

As illustrated in FIG. 2, the printing device 100 further includes an attachment portion 101, a printing portion 102, a conveying portion 103, a cutter portion 104, an acquiring portion 105, a drive-force input portion 106, and a controller 107. Incidentally, FIG. 2 illustrates a state where the display 112 is removed from the housing 110.

The attachment portion 101 is in a form of a recess for detachably receiving the cassette 10 therein. The attachment portion 101 has a function for positioning the cassette 10. The attachment portion 101 is provided on the housing 110. The display 112 also functions as a lid for covering the cassette 10 received in the attachment portion 101.

Incidentally, an inserting direction of the cassette 10 into the attachment portion 101 will be referred to as a "downward direction", and a detaching direction of the cassette 10 from the attachment portion 101 will be referred to as an "upward direction".

The printing portion 102 is positioned inside the attachment portion 101. The printing portion 102 is a print head configured to perform printing on a printing tape 11A (FIG. 2) accommodated in the cassette 10.

The printing portion 102 includes a plurality of heat generating elements each of whose heat generation is under control by the controller 107. The printing portion 102 is positioned in an opening portion 18 (described later) of the cassette 10 attached to the attachment portion 101, as illustrated in FIG. 3.

Hereinafter, a direction in which the printing tape 11A is discharged from the printing device 100 will be referred to a "leftward direction", which is perpendicular to the upward/downward direction. And a direction opposite to the tape discharging direction (leftward direction) will be referred to as a "rightward direction". Further, a direction perpendicular to the upward/downward direction and the leftward/rightward direction will be referred to as a "frontward/rearward direction."

The conveying portion 103 is configured to convey the printing tape 11A in a normal conveying direction and in a reverse conveying direction. As illustrated in FIG. 3, the conveying portion 103 includes a platen roller 103A, a pressure roller 103B, and a roller holder 103C.

The platen roller 103A is positioned inside the attachment portion 101 at a position adjacent to the printing portion 102 so as to face the printing portion 102. The platen roller 103A is rotatable in the normal conveying direction for conveying the printing tape 11A from the printing portion 102 to the cutter portion 104 and in the reverse conveying direction which is opposite to the normal conveying direction.

The platen roller 103A is rotationally driven by a platen gear (not illustrated) connected to the platen roller 103A. The platen gear is configured to be rotated by a driving force received from the cassette 10, the driving force being initially transmitted from the drive-force input portion 106 to the cassette 10. A rotational direction of the drive-force input portion 106 determines a rotational direction of the platen roller 103A.

The pressure roller 103B is positioned downstream of the platen roller 103A in a discharging direction of the printing tape 11A. The pressure roller 103B is configured to press a laminate tape 13A (described later) toward the printing tape 11A in cooperation with a pinch roller 15 (described later) of the cassette 10.

The roller holder 103C holds the platen roller 103A and the pressure roller 103B. The roller holder 103C is pivotally movable to move the platen roller 103A and the pressure roller 103B toward and away from the printing portion 102 and the cassette 10.

The cutter portion 104 includes a cutter configured to cut the printing tape 11A printed by the printing portion 102. The cutter portion 104 is positioned at a discharge opening of the attachment portion 101 through which the printing tape 11A is discharged. That is, the cutter portion 104 is positioned downstream of the printing portion 102 and the conveying portion 103 in the discharging direction of the printing tape 11A.

The acquiring portion 105 illustrated in FIG. 2 is configured to acquire control information from the cassette 10. Specifically, the acquiring portion 105 includes an information reading sensor of a mechanical type, or an optical type, or an electromagnetic type to detect the control information from a storage portion 19 of the cassette 10.

The drive-force input portion 106 includes a shaft configured to transmit the driving force to the cassette 10. Specifically, the drive-force input portion 106 is engageable with a take-up spool 14 (described later) of the cassette 10 to rotate the take-up spool 14. Further, the drive-force input portion 106 is also engageable with an input gear 16 (described later) of the cassette 10 to transmit the driving force to the input gear 16.

The drive-force input portion 106 is positioned inside the attachment portion 101. The drive-force input portion 106 is rotatable about its axis by a drive source (not illustrated) which may be constituted by a combination of a motor and a gear(s), for example.

Figure 4:
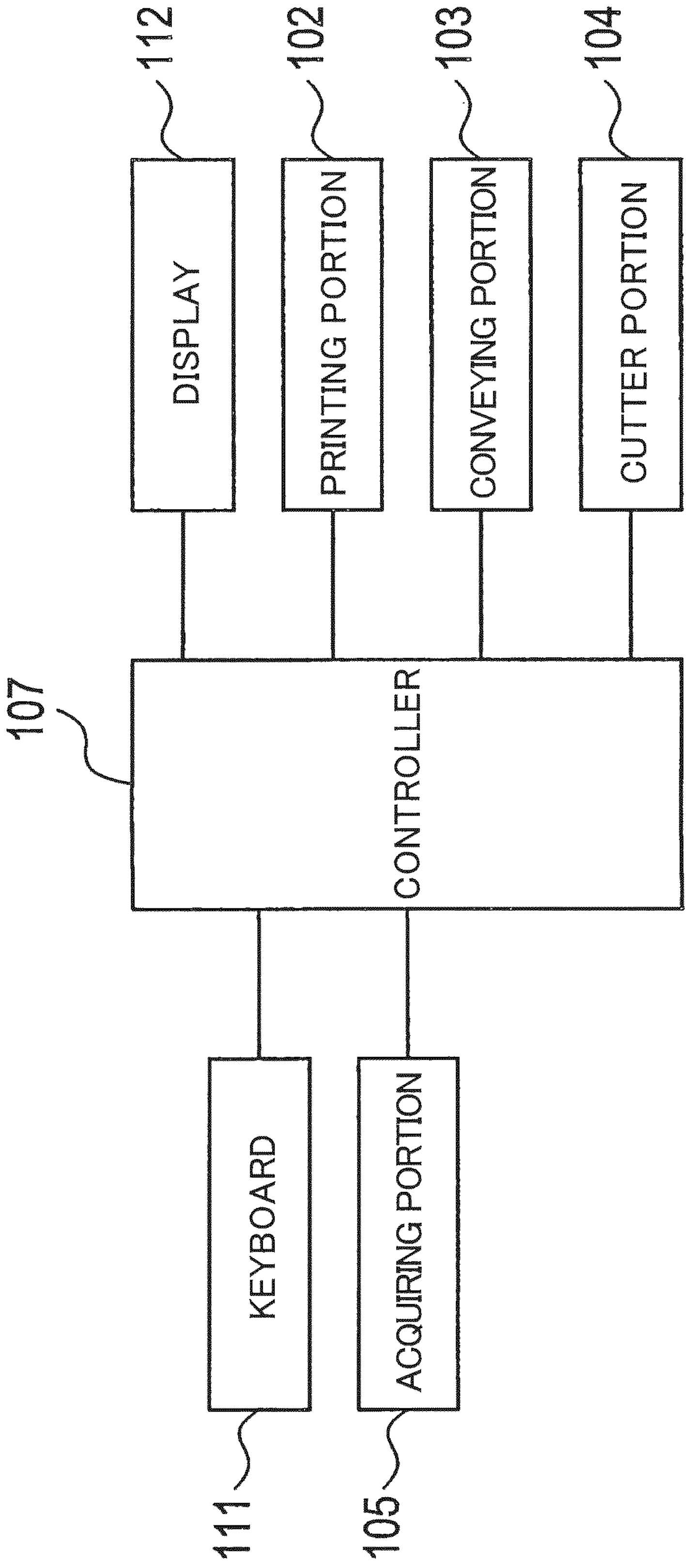
FIG. 4 is a block diagram schematically illustrating an electrical configuration among a controller and other components in the printing device.

As illustrated in FIG. 4, the controller 107 is electrically connected to the keyboard 111 and the acquiring portion 105 for processing information transmitted from the keyboard 111 and the acquiring portion 105. Further, the controller 107 is configured to provide control over the display 112, the printing portion 102, the conveying portion 103, and the cutter portion 104.

The controller 107 is constituted by, for example, a computer including a processor, storage mediums such as a RAM and a ROM, and an input/output portion. The controller 107 is configured to execute pre-stored programs to control printing, conveyance and cutting with respect to the printing tape 11A. Details on the processing performed by the controller 107 will be described later.

<Structure of Cassette 10>

Details of the cassette 10 will be described next.

Figure 3:
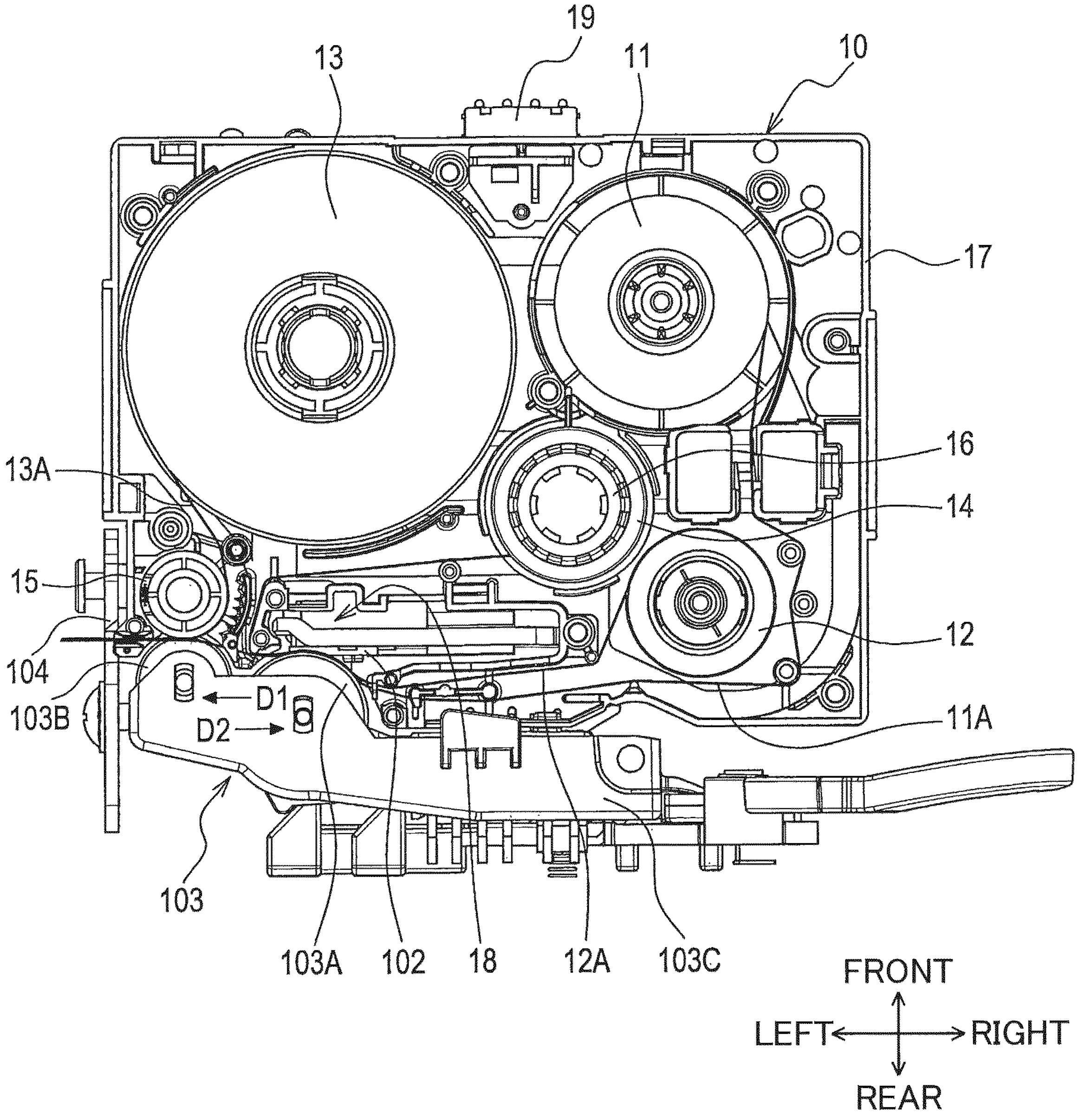
FIG. 3 is a partially-enlarged view schematically illustrating a printing portion and in the vicinity thereof in the printing device, and the cassette accommodated in an attachment portion of the printing device.

The cassette 10 illustrated in FIG. 3 accommodates therein the printing tape 11A which is the elongated or tape-like printing medium. The cassette 10 is used with the printing device 100 to create a printed product where the laminate tape 13A is stuck to the printing tape 11A on which an image is printed.

The cassette 10 is adapted to be detachably attachable to the printing devices 100 of various kinds, for example, to those printing devices 100 among which diameters of the respective platen rollers 103A are different from one another. Replacing the cassette 10 with a new cassette 10 can realize replenishment of the printing medium and/or change in the kinds of the printing medium such as a size, color and material of the medium.

The cassette 10 includes a first roll 11, a second roll 12, a third roll 13, the take-up spool 14, the pinch roller 15, the input gear 16, a case 17, the opening portion 18, and the storage portion 19.

The first roll 11 is a roll of the printing tape 11A wound over a first spool. Printing is performed on a surface of the printing tape 11A by the printing portion 102 of the printing device 100 with an ink ribbon 12A described later. The first roll 11 and the first spool are rotated in accordance with the conveyance of the printing tape 11A caused by the rotation of the platen roller 103A of the printing device 100, thereby supplying the printing tape 11A to the printing portion 102.

The second roll 12 is a roll of the ink ribbon 12A wound over a second spool. The ink ribbon 12A is used for printing on the surface of the printing tape 11A. The ink ribbon 12A is superposed with the printing tape 11A at the opening portion 18 and is exposed to the printing portion 102 for printing. The ink ribbon 12A used for printing is wound over the take-up spool 14. The second roll 12 and the second spool are rotated in accordance with the taking-up of the ink ribbon 12A over the take-up spool 14, thereby supplying the ink ribbon 12A to the printing portion 102.

The third roll 13 is a roll of the laminate tape 13A wound over a third spool. The laminate tape 13A is used for protecting the printed surface of the printing tape 11A. The third roll 13 and the third spool are rotated by the rotations of the pinch roller 15 and the pressure roller 103B, thereby supplying the laminate tape 13A for lamination over the printing tape 11A.

The take-up spool 14 has a hollow cylindrical shape having an inner peripheral surface defining a hollow space in the take-up spool 14. Spline teeth are provided on the inner peripheral surface of the take-up spool 14. Upon attachment of the cassette 10 to the attachment portion 101, the drive-force input portion 106 is inserted in the hollow space of the take-up spool 14. The inserted drive-force input portion 106 is engageable with the spline teeth of the take-up spool 14 to transmit the driving force to the take-up spool 14. The take-up spool 14 is rotated by the rotation of the drive-force input portion 106 for the take-up of the used ink ribbon 12A.

The pinch roller 15 is configured to nip the printing tape 11A and the laminate tape 13A in a thickness direction of the tapes in cooperation with the pressure roller 103B. The laminate tape 13A and the printing tape 11A are thus stuck to each other.

The input gear 16 has a center hole in which the drive-force input portion 106 is insertable. Spline teeth are provided on an inner peripheral surface defining the center hole of the input gear 16. The input gear 16 is coaxial with the take-up spool 14, and is overlapped with the take-up spool 14 in the upward/downward direction. The driving force input into the input gear 16 from the drive-force input portion 106 is transmitted to the platen roller 103A (more precisely, to the platen gear) through a power transmission mechanism (not illustrated) provided inside the cassette 10.

The case 17 accommodates therein the first roll 11, the second roll 12, the third roll 13, the take-up spool 14, the pinch roller 15, the input gear 16, and the power transmission mechanism.

The opening portion 18 is a notched part of the case 17. The printing tape 11A is exposed to an outside of the case 17 through the opening portion 18. The opening portion 18 provides a space for positioning the printing portion 102 therein when the cassette 10 is attached to the attachment portion 101. Printing on the printing tape 11A by the printing portion 102 is performed at the opening portion 18.

The printing tape 11A and the ink ribbon 12A are designed to extend in the leftward/rightward direction at the opening portion 18. The printing tape 11A subjected to printing is conveyed by the conveying portion 103 toward an outside of the printing device 100 through the opening portion 18. The ink ribbon 12A used for printing by the printing portion 102 and positioned in the opening portion 18 is subsequently taken up by the take-up spool 14.

The storage portion 19 is configured to store control information which is used for execution of reverse conveyance of the printing tape 11A by the conveying portion 103 of the printing device 100. The control information stored in the storage portion 19 is configured to be detected by the acquiring portion 105 of the printing device 100. For detection of the storage portion 19, a contact type or non-contact type detection may be available. The storage portion 19 may be constituted by electronic circuits, or physical mapping markers.

The electronic circuits may include: a memory storing the control information; and an RFID (radio frequency identification) tag for enabling the acquiring portion 105 to acquire the control information. The physical mapping markers may be: recessed portions, holes, protrusions, or a combination of these elements provided on the case 17.

The position of the storage portion 19 is not limited to the position illustrated in FIG. 4, provided that the acquiring portion 105 of the printing device 100 can detect the storage portion 19. Further, the cassette 10 may include a plurality of storage portions 19 each storing a section of the control information.

<Control Information>

The control information stored in the storage portion 19 at least contains information about by how much amount the printing tape 11A should be conveyed in reverse, i.e., in a direction opposite the conveying direction of the printing tape 11A from the inside of the case 17 toward the opening portion 18 (hereinafter, to be referred to as "reverse conveying amount" of the printing tape 11A).

The information on the reverse conveyance amount is set for each printing tape 11A. As the information on the reverse conveyance amount, the control information contains at least one of: information on distance, information on rotation, information on temperature, information on humidity, information on usage, information on characteristics of the printing medium, information on applicability of reverse conveyance, and authentication information on cassette.

Information on Distance

The distance information is indicative of the distance by which the printing tape 11A is conveyed in reverse by the platen roller 103A with a unit of, for example, mm. Alternatively, the distance information may be coefficients (relative values indicating long and short conveyance distances) so that the controller 107 uses the coefficient to determine the reverse conveyance amount.

Incidentally, the control information may contain a plurality of distance information prepared for respective kinds of the printing devices 100. For example, the plurality of distance information may contain: a first reverse conveyance distance for a printing device 100 provided with a mechanism for measuring a rotation angle of the platen roller 103A; and a second reverse conveyance distance for a printing device 100 without the measuring mechanism. In this case, the second reverse conveyance distance may be set smaller than the first reverse conveyance distance in order to secure a margin to offset rotational displacement of the platen roller 103A.

Further, the control information main also contain a plurality of distance information prepared for respective printing modes of the printing device 100. For example, the plurality of distance information may contain: a third reverse conveyance distance for a printing mode with a small margin; and a fourth reverse conveyance distance for a printing mode with a large margin. In this case, the fourth reverse conveyance distance may be set smaller than the third reverse conveyance distance in order to ensure a larger margin at a leading end portion of the printing tape 11A in a subsequent printing.

Information on Rotation

The information on rotation is indicative of the rotation angle of the platen roller 103A at the time of reverse conveyance with a unit of radian (rad) or angle (°), or the number of steps of the motor for reversely rotating the platen roller 103A at the time of reverse conveyance. The control information may contain a plurality of rotational information prepared for the respective kinds of the printing devices 100.

For example, the plurality of rotational information may be prepared for the respective platen rollers 103A having diameters different from one another. The plurality of rotational information may be represented in a table format with respect to the respective diameters. The greater the diameter is, the smaller the rotation angle of the platen roller 103A or the number of steps of the motor is set as the rotational information.

Information on Temperature and Humidity

The information on temperature is indicative of an upper limit temperature for tolerating reverse conveyance of the printing tape 11A with a unit of "° C.". The information on humidity is indicative of an upper limit humidity for tolerating reverse conveyance of the printing tape 11A with a unit of "%".

Information on Usage

The information on usage is indicative of a consumption amount of the printing tape 11A, or a time period for which the cassette 10 is used (usage time period). Specifically, the information on usage includes a diameter of the first roll 11 (that is, a residual amount of the printing tape 11A of the first roll 11), a manufacturing date and time of the cassette 10, and the like. The information on usage is updated by the printing device 100 every time the cassette 10 is used.

Information on Characteristics of the Printing Medium

The information on characteristics of the printing medium is indicative of a curling nature of the printing medium. For example, the information on characteristics contains a width, a thickness, a material, and a layer structure of the printing tape 11A, and an inner diameter of the first roll 11 (that is, an outer diameter of the first spool).

Information on Applicability of Reverse Conveyance

The information on applicability of reverse conveyance is indicative of whether the reverse conveyance of the printing tape 11A should be performed. The information on applicability indicates a value to prohibit the reverse conveyance in a case where the printing tape 11A cannot stand the reverse conveyance due to characteristics thereof. For example, the reverse conveyance is prohibited for the printing tape 11A whose linearity or rigidity is deemed insufficient, because tape jamming is likely to result during the reverse conveyance of such printing tape 11A.

Authentication Information

The authentication information on cassette is indicative of whether the cassette 10 is applicable to be used in the printing device 100. Ina case where the cassette 10 is matched with the printing device 100, authentication by the controller 107 is successfully performed by the authentication information acquired by the acquiring portion 105. On the other hand, in a case where the cassette 10 is unmatched with the printing device 100, authentication by the controller 107 ends up with a failure.

<Processing Performed by Controller 107>

Next, various processing performed by the controller 107 will be described.

Specifically, according to the embodiment, the controller 107 is configured to perform an acquisition process, an authentication process, a determination process, a printing process, a conveying process, a cutting process, a reverse conveying process, and a forcible reverse conveying process.

Acquisition Process

The acquisition process is configured to be started upon attachment of the cassette 10 to the attachment portion 101. In the acquisition process, control information is acquired from the cassette 10 attached to the attachment portion 101 by the acquiring portion 105.

Specifically, the controller 107 acquires, from the storage portion 19, necessary information from among the information on distance, information on rotation, information on temperature, information on humidity, information on usage, information on characteristics of the printing medium, information on applicability of reverse conveyance, and authentication information on cassette.

The controller 107 is configured not to perform the reverse conveying process in a case where the controller 107 cannot acquire part of the information from the plurality of information which should be acquired from the storage portion 19 in the acquisition process. For example, even if a value representing the reverse conveyance distance is obtained as the information on distance, the controller 107 will not perform the reverse conveying process in a case where a label for discriminating the third reverse conveyance distance from the fourth reverse conveyance distance cannot be acquired, that is, in a case where discrimination cannot be made between the reverse conveyance distance associated with the printing mode for the small margin and the reverse conveyance distance associated with the printing mode for the large margin.

Further, the controller 107 will not perform the reverse conveying process in a case where the acquired information on applicability of reverse conveyance indicates that the reverse conveyance should be prohibited.

Further, the controller 107 will not perform the reverse conveying process in a case where the temperature ambient to the printing device 100 exceeds the upper limit temperature indicated by the information on temperature, or in a case where the humidity ambient to the printing device 100 exceeds the upper limit humidity indicated by the information on humidity. The ambient temperature and the ambient humidity are measured by sensors provided in the printing device 100.

Authentication Process

In the authentication process, the cassette 10 attached to the attachment portion 101 is authenticated. Specifically, the authentication is performed by collation of the authentication information on cassette acquired by the acquiring portion 105 from the storage portion 19 in the acquisition process. The controller 107 will not perform the reverse conveying process when the authentication on the cassette 10 is unsuccessful.

Determination Process

In the determination process, the reverse conveyance amount of the printing tape 11A is determined based on the acquired control information.

Specifically, the controller 107 determines the reverse conveyance amount of the printing tape 11A based on the distance information or the rotation information according to the kinds of the printing device 100. At this time, the controller 107 sets the reverse conveyance amount smaller, as the consumption amount or the time period indicated in the information on usage is greater. Further, the controller 107 sets the reverse conveyance amount smaller, as the information on characters of the printing medium indicates a greater curling nature of the printing tape 11A.

The reverse conveyance amount may be corrected depending on the use information or the medium characteristics information with reference to a table showing the reverse conveyance amount corresponding to the consumption amount, the use time, or the curling nature. Alternatively, the reverse conveyance amount may be corrected by a function using the consumption amount, the use time, or the curling nature as parameters.

Further, the controller 107 may correct the reverse conveyance amount to be smaller in accordance with an elevation of the ambient temperature or the ambient humidity. For example, the controller 107 may not perform any correction to the reverse conveyance amount in a case where the ambient temperature is equal to or lower than a predetermined threshold temperature; and the controller 107 may perform an arithmetic operation to lower the reverse conveyance amount responsive to the increase in ambient temperature in a case where the ambient temperature exceeds the predetermined threshold temperature but is equal to or lower than the upper limit temperature.

Further, the controller 107 may be configured not to implement the reverse conveyance in a case where a sum of the present cumulative rotation distance of the platen roller 103A and the obtained reverse conveyance amount exceeds a tolerance of the rotation distance of the platen roller 103A.

The tolerance of the rotation distance is indicative of a predetermined upper limit of use of the platen roller 103A, i.e., an upper limit of the service life of the platen roller 103A. If the rotation of the platen roller 103A exceeds the tolerance of the rotation distance, slippage may occur due to frictional wearing of the platen roller 103A, which is likely to bring about a failure in the reverse conveyance.

Printing Process

In the printing process, printing is performed on the printing tape 11A positioned within the opening portion 18 by the printing portion 102. The printing process is configured to be started in response to user's input.

Conveying Process

In the conveying process, the printing tape 11A on which printing was performed by the printing portion 102 is conveyed by the conveying portion 103 from the printing portion 102 to the cutter portion 104. Specifically, the controller 107 drives the drive-force input portion 106 to rotate the same in the normal conveying direction to convey the printing tape 11A upon completion of the printing process.

Cutting Process

In the cutting process, the printing tape 11A is cut by the cutter portion 104 such that the printed part of the printing tape 11A is separated from the non-printed part of the printing tape 11A. Specifically, upon completion of the conveying process, the controller 107 drives a motor of the cutter portion 104 to move a cutter blade of the cutter portion 104 toward the printing tape 11A.

Reverse Conveying Process

In the reverse conveying process, the printing tape 11A from which the printed part has been separated is reversely conveyed by the conveying portion 103 from the cutter portion 104 to the printing portion 102 based on the reverse conveyance amount determined in the determination process. Specifically, after the cutting process, the controller 107 drives the drive-force input portion 106 to rotate the same in the reverse conveying direction to reversely convey the printing tape 11A.

In the embodiment, the controller 107 is configured not to perform the reverse conveying process in a case where any one of the following cancellation conditions is met.

(Cancellation Condition 1)

The cancellation condition is considered to be met in a case where the controller 107 cannot acquire a part of information from the plurality of necessary information to be acquired from the storage portion 19 in the acquisition process. For example, even if a value representing the reverse conveyance distance is obtained as the information on distance, the controller 107 will not perform the reverse conveying process in a case where a label for discriminating the third reverse conveyance distance from the fourth reverse conveyance distance cannot be acquired, that is, in a case where discrimination cannot be made between the reverse conveyance distance associated with the printing mode for the small margin and the reverse conveyance distance associated with the printing mode for the large margin.

(Cancellation Condition 2)

The cancellation condition is considered to be met in a case where the information on applicability of reverse conveyance indicates that the reverse conveyance should be prohibited.

(Cancellation Condition 3)

The cancellation condition is considered to be met in a case where the temperature ambient to the printing device 100 exceeds the upper limit temperature indicated by the information on temperature. The ambient temperature may be measured by a sensor provided in the printing device 100.

(Cancellation Condition 4)

The cancellation condition is considered to be met in a case where the humidity ambient to the printing device 100 exceeds the upper limit humidity indicated by the information on humidity. The ambient humidity may be measured by a sensor provided in the printing device 100.

(Cancellation Condition 5)

The cancellation condition is considered to be met in a case where the authentication on the cassette 10 is unsuccessful in the authentication process.

Forcible Reverse Conveying Process

In the forcible reverse conveying process, the printing tape 11A is forced to be conveyed reversely in response to a user's command instructing forcible reverse conveyance of the printing tape 11A in a case where the reverse conveyance process has not been performed after the cutting process.

Specifically, in a case where any one of the above-described cancellation conditions is met, the controller 107 drives the drive-force input portion 106 to rotate the same in the reverse conveying direction, in order to compulsorily convey the printing tape 11A in the reverse conveying direction pursuant to the user's command. The reverse conveyance amount in the forcible reverse conveying process may be set to be: the reverse conveyance amount determined in the determination process; a specific reverse conveyance amount designated by the user; or a prescribed reverse conveyance amount predetermined for the forcible reverse conveyance of the printing tape 11A.

The command to execute the forcible reverse conveyance may be inputted by the user through the keyboard 111 each time any one of the above-described cancellation conditions to cancel the reverse conveyance is met. Alternatively, whether to perform the forcible reverse conveyance may be set and stored in the storage medium (memory) of the controller 107 in advance by the user.

<Exemplary Processing after Printing and Cutting of the Printing Tape 11A>

Next, one example of processing performed by the controller 107 after executing the printing and cutting processes will be described with reference to a flowchart illustrated in FIG. 5. That is, the following processing is configured to be performed with respect to the printing tape 11A to which printing and cutting have been performed.

After cutting to the printing tape 11A is completed, the controller 107 determines whether the authentication in the authentication process is successful (S110). In a case where the authentication has failed (S110: NO), the controller 107 sets a first flag to 1 (that is, the first flag is ON) (S120). On the other hand, in a case where the authentication is successful (S110: YES), the controller 107 maintains the first flag in a default state (that is, the first flag remains zero).

The controller 107 then determines whether or not the printing tape 11A can be reversely conveyed by way of the information on applicability of reverse conveyance (S130). In a case where the reverse conveyance is prohibited (S130: NO), the controller 107 sets a second flag to 1 (S140). On the other hand, in a case where the reverse conveyance is allowed (S130: YES), the controller 107 maintains the second flag in a default state (that is, the second flag remains zero).

The controller 107 then determines whether all necessary information has been acquired (S150). Ina case where any of the necessary information has not been acquired (S150: NO), the controller 107 sets a third flag to 1 (S160). On the other hand, in a case where all necessary information is acquired (S150: YES), the controller 107 maintains the third flag in a default state (that is, the third flag remains zero).

The controller 107 then determines whether the ambient temperature is equal to or less than the upper limit temperature that enables the reverse conveyance (S170). In a case where the ambient temperature exceeds the upper limit temperature (S170: NO), the controller 107 sets a fourth flag to 1 (S180). On the other hand, in a case where the ambient temperature is equal to or less than the upper limit temperature (S170: YES), the controller 107 maintains the fourth flag in a default state (that is, the fourth flag remains zero).

The controller 107 then determines whether the ambient humidity is equal to or less than the upper limit humidity that enables the reverse conveyance (S190). In a case where the ambient humidity exceeds the upper limit humidity (S190: NO), the controller 107 sets a fifth flag to 1 (S200). On the other hand, in a case where the ambient humidity is equal to or less than the upper limit humidity (S190: YES), the controller 107 maintains the fifth flag in a default state (that is, the fifth flag remains zero).

Subsequently, the controller 107 determines the reverse conveyance amount, and determines whether the determined reverse conveyance amount is equal to or less than the tolerance of the rotation distance (S210). In a case where the determined reverse conveyance amount exceeds the tolerance (S210: NO), the controller 107 sets a sixth flag to 1 (S220). On the other hand, in a case where the determined reverse conveyance amount is equal to or less than the tolerance (S210: YES), the controller 107 maintains the sixth flag in a default state (that is, the sixth flag remains zero).

The controller 107 then determines whether all the flags (first through sixth flags) are set to zero (S230). In a case where all the flags are set to zero (S230: YES), the controller 107 executes the reverse conveying process to perform the reverse conveyance of the printing tape 11A (S240).

On the other hand, in a case where any one of the flags is set to 1 (S230: NO), the controller 107 determines whether there is a user's commend instructing execution of forcible reverse conveyance (S250). In a case where there the forcible reverse conveyance is instructed (S250: YES), the controller 107 performs the forcible reverse conveying process to perform the reverse conveyance of the printing tape 11A (S240). On the other hand, in a case where the forcible reverse conveyance is not instructed (S250: NO), the controller 107 cancels execution of the forcible reverse conveyance (S260).

After performing or cancelling the reverse conveyance of the printing tape 11A, the controller 107 clears all the flags to bring all the flags back to respective default values (S270).

Figure 5:
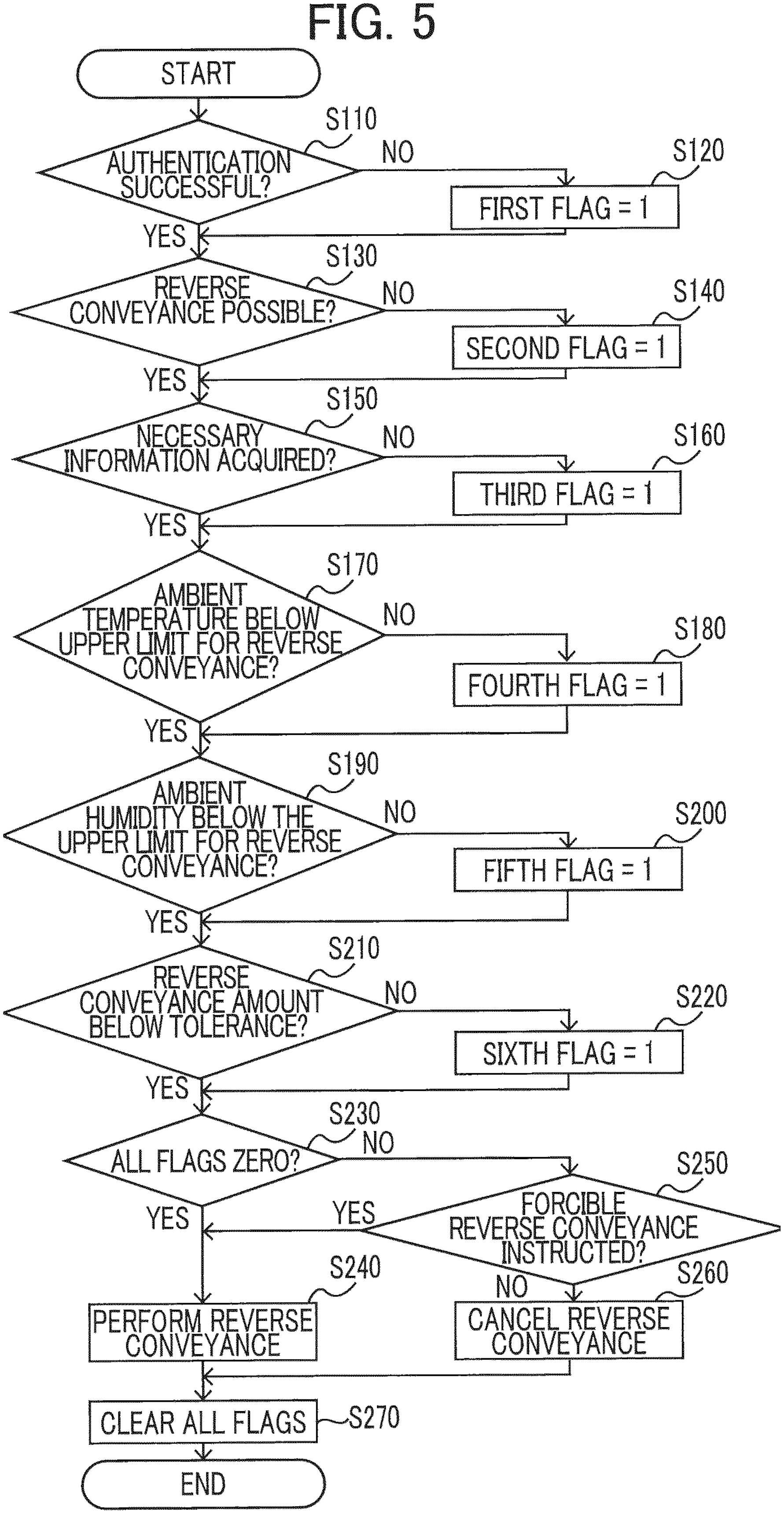
FIG. 5 is a flow chart illustrating an exemplary process to be executed by the controller in the printing device.

Incidentally, in the flowchart illustrated in FIG. 5, in a case where any of the cancellation conditions to cancel the reverse conveyance is met (for example, in case of failure in authentication), the controller 107 may be configured to skip remaining intervening process(es) and directly proceed to the step S250, rather than setting the flags, to confirm whether the forcible reverse conveyance is instructed by the user.

<Technical and Operational Advantages of the Embodiment>

According to the above-described embodiment following advantageous effects can be obtained.

(a) Since the reverse conveyance amount is determined based on the control information associated with the cassette 10, the reverse conveyance amount of the printing tape 11A can be adjusted in accordance with the characteristics of the printing device 100 and/or the printing tape 11A. As a result, occurrence of failure at the time of reverse conveyance of the printing tape 11A can be restrained.

(b) The reverse conveying process is configured not to be performed unless all of the plurality of necessary information is acquired, i.e., in a case where the controller 107 fails to acquire a part of information of the plurality of necessary information in the acquisition process. This structure can restrain the reverse conveyance of the printing tape 11A by an inadvertent conveying amount.

(c) The diameter of the first roll 11 decreases in accordance with an increase in consumption amount of the printing tape 11A. Hence, curling tendency of the printing tape 11A supplied to the opening portion 18 is increased, as the consumption amount of the printing tape 11A increases. Further, a time period for maintaining the rolled shape of the printing tape 11A is prolonged in proportion to an increase in usage time period of the cassette 10, i.e., increase in elapsed time from the manufacturing date of the cassette 10.

Hence, curling tendency of the printing tape 11A is also increased, as more time has elapsed from the manufacturing date of the cassette 10.

In this respect, according to the present embodiment, the reverse conveyance amount of the printing tape 11A is corrected to be smaller in accordance with the increase in consumption amount of the printing tape 11A or the increase in use time of the cassette 10 based on the use information contained in the control information. With this configuration, the reverse conveyance amount can be adjusted in conformance with the intensity of the curling nature of the printing tape 11A. As a result, occurrence of failure at the time of reverse conveyance can be restrained.

(d) The reverse conveyance amount of the printing tape 11A is corrected to be smaller in accordance with the increase in curling tendency of the printing tape 11A based on the information on characteristics of the printing medium contained in the control information. Hence, the reverse conveyance amount can be adjusted in conformity with the degree of curling tendency. As a result, occurrence of failure at the time of reverse conveyance can be restrained.

(e) The reverse conveying process is configured not to be executed in a case where the ambient temperature exceeds the upper limit temperature and/or the ambient humidity exceeds the upper limit humidity. This configuration can obviate a failure attributed to reverse conveyance of the printing tape 11A having higher curling tendency.

(f) The reverse conveying process is configured not to be executed in a case where the information on applicability of reverse conveyance indicates prohibition of reverse conveyance, and/or in a case where the authentication on the cassette 10 is unsuccessful. This configuration can suppress the reverse conveyance of the printing tape 11A of cassette 10 which is deemed inappropriate for the reverse conveyance. Accordingly, faulty use of the cassette 10 and the printing device 100 can be obviated.

(g) The control information contains a plurality of distance information and/or a plurality of rotation information each for every kind of printing device 100. With this configuration, occurrence of failure at the time of reverse conveyance can be restrained, while the cassette 10 can be utilized as a common cassette that is universally applicable to the different kinds of printing devices 100.

2. Variations and Modifications

While the description has been made in detail with reference to the specific embodiment, it would be apparent to those skilled in the art that various changes and modifications may be made therein without departing from the scope of the disclosure.

(a) The printing device and the cassette of the disclosure need not be limited to those of the disclosed type using the ink ribbon for printing an image on the printing medium. For example, the cassette of the disclosure may include a heat-sensitive tape as a printing medium configured to be printed by the printing portion.

(b) The control information of the disclosure may not include the authentication information on the cassette. For example, the controller of the printing device may be configured to perform authentication on the cassette by the recognition of a shape or an internal structure of the cassette.

(c) The cassette of the disclosure may not include the laminate tape. In a cassette without the laminate tape, there is no need to stick the laminate tape and the printed printing tape together by the pinch roller and the pressure roller. Hence, an increased reverse conveyance amount can be set in the control information.

(d) One element having a plurality of functions in the above-described embodiment may be configured as a plurality of elements to realize the same functions. Likewise, a plurality of elements having various functions may configured into a single element capable of achieving the same functions. Further, part of the elements of the depicted embodiment may be omitted. Still alternatively, at least a part of the elements of the depicted embodiment may be added to, or transferred to, or replaced with another alternative configuration of the embodiment.

The disclosure may include other various embodiments belonging to techniques defined by the scope of the claims.

<Remarks>

The printing device 100 is an example of a printing device. The attachment portion 101 is an example of an attachment portion. The conveying portion 103 is an example of a conveying portion. The printing portion 102 is an example of a printing portion. The cutter portion 104 is an example of a cutter portion. The controller 107 is an example of a controller. The platen roller 103A is an example of a platen roller of the conveying portion. The cassette 10 is an example of a cassette configured to be detachably attached to the attachment portion. The printing tape 11A is an example of a printing medium of the cassette. The case 17 is an example of a case of the cassette. The storage portion 19 is an example of a storage portion of the cassette.

What is claimed is:

1. A printing device comprising;

an attachment portion configured to detachably receive a cassette accommodating a tape-like printing medium;

a conveying portion configured to convey the printing medium in a normal conveying direction and in a reverse conveying direction opposite each other;

a printing portion configured to perform printing on the printing medium;

a cutter portion configured to cut the printing medium after the printing; and a controller configured to perform:

a conveying process to control the conveying portion to convey the printing medium in the normal conveying direction from the printing portion to the cutter portion;

a cutting process to control the cutter portion to cut the printing medium to separate a portion of the printing medium printed by the printing portion from a remaining non-printed portion of the printing medium;

an acquisition process to acquire control information from the cassette by reading the control information stored in an electric circuit of the cassette received in the attachment portion, the control information being information determined by a type of the printing medium of the cassette received in the attachment portion;

a determination process to adjust a reverse conveyance amount of the printing medium specific to the type of the printing medium by using a value obtained from the control information that is read from the electric circuit of the cassette and that is acquired in the acquisition process; and a reverse conveying process to control the conveying portion to convey the remaining non-printed portion of the printing medium in the reverse conveying direction from the cutter portion to the printing portion by the reverse conveyance amount determined in the determination process.

2. The printing device according to claim 1, wherein the controller is configured to acquire a plurality of pieces of necessary information as the control information from the cassette in the acquisition process, and wherein the controller is further configured not to perform the reverse conveying process in a case where the controller fails to acquire a part of the plurality of pieces of necessary information in the acquisition process.

3. The printing device according to claim 1, wherein, in the acquisition process, the controller is configured to acquire a consumption amount of the printing medium or information on a usage time period of the cassette as the control information, and wherein, in the determination process, the controller is configured to determine the reverse conveyance amount to be smaller, as the consumption amount or the usage time period acquired in the acquisition process is greater.

4. The printing device according to claim 1, wherein, in the acquisition process, the controller is configured to acquire information on characteristics of the printing medium relating to curling tendency of the printing medium as the control information, and wherein, in the determination process, the controller is configured to determine the reverse conveyance amount to be smaller, as the curling tendency of the printing medium based on the information on characteristics of the printing medium is greater.

5. The printing device according to claim 1, wherein, in the acquisition process, the controller is configured to acquire, as the control information, information on temperature indicative of an upper limit temperature for tolerating reverse conveyance of the printing medium, and wherein, in the determination process, the controller is configured to correct the reverse conveyance amount to be smaller in a case where an ambient temperature exceeds the upper limit temperature acquired in the acquisition process.

6. The printing device according to claim 1, wherein, in the acquisition process, the controller is configured to acquire, as the control information, information on humidity indicative of an upper limit humidity for tolerating reverse conveyance of the printing medium, and wherein, in the determination process, the controller is configured to correct the reverse conveyance amount to be smaller in a case where an ambient humidity exceeds the upper limit humidity acquired in the acquisition process.

7. The printing device according to claim 1, wherein, in the acquisition process, the controller is configured to acquire, as the control information, information on applicability of reverse conveyance indicative of whether the reverse conveyance of the printing medium should be performed, and wherein the controller is configured not to perform the reverse conveying process in a case where the information on applicability of reverse conveyance indicates prohibition of the reverse conveyance of the printing medium.

8. The printing device according to claim 1, wherein the controller is further configured to perform an authentication process to authenticate the cassette received in the attachment portion based on the control information acquired in the acquisition process, and wherein the controller is configured not to perform the reverse conveying process in a case where authentication on the cassette is unsuccessful in the authentication process.

9. The printing device according to claim 1, wherein the conveying portion comprises a platen roller configured to rotate to convey the printing medium in the normal conveying direction and in the reverse conveying direction, and wherein the controller is configured not to perform the reverse conveying process in a case where a sum of a cumulative rotation distance of the platen roller and the reverse conveyance amount determined in the determination process exceeds a tolerance of a rotation distance of the platen roller indicative of an upper limit of a service life of the platen roller.

10. The printing device according to claim 1, wherein the controller is further configured to receive a user's command to force the conveying portion to convey the printing medium in the reverse conveying direction from the cutter portion to the printing portion, and wherein the controller is configured to perform reverse conveyance of the printing medium in response to receipt of the user's command in a case where the reverse conveying process is not performed.

* * * * *